United States Patent [19]
Schreck

[11] Patent Number: 6,020,043
[45] Date of Patent: Feb. 1, 2000

[54] SEALING MAT FOR USE IN CIVIL AND UNDERGROUND ENGINEERING FOR THE INSULATION OF SOIL AGAINST LIQUIDS

[76] Inventor: Paul Schreck, An der Heeg 24, 6983 Kreuzwertheim-Unterwittbach, Germany

[21] Appl. No.: 07/958,257

[22] Filed: Oct. 8, 1992

[51] Int. Cl.⁷ .............................. B32B 5/16; B32B 5/30; B32B 7/08
[52] U.S. Cl. ................. 428/70; 428/72; 428/74; 428/76; 428/102; 442/318; 442/319
[58] Field of Search .................... 428/70, 72, 71, 428/74, 76, 234, 237, 240, 102; 442/318, 319

[56] References Cited

U.S. PATENT DOCUMENTS

| | | | |
|---|---|---|---|
| 3,563,837 | 2/1971 | Smith | 428/71 |
| 4,424,248 | 1/1984 | Tesch | 428/72 |
| 4,501,788 | 2/1985 | Clem | 428/261 |
| 4,622,260 | 11/1986 | Tesch | 428/72 |
| 4,997,695 | 3/1991 | Clem | 428/72 |
| 4,997,701 | 3/1991 | Clem | 428/76 |
| 5,041,330 | 8/1991 | Heerten | 428/213 |

*Primary Examiner*—Jenna Davis
*Attorney, Agent, or Firm*—Edwin D. Schindler

[57] ABSTRACT

A sealing mat is proposed for use in civil and underground engineering for the insulation of soil against liquids, especially water, having two outer layers consisting of a fibrous material, between which is placed a powder of mineral sealing material, e.g. bentonite, and the two layers are connected with each other, whereby between the two layers (1, 2) an aero-fleece is place, in which the powder (4) of mineral sealing material is stored, and the two layers (1, 2) are sewn to each other with the aero-fleece located in between.

9 Claims, 1 Drawing Sheet

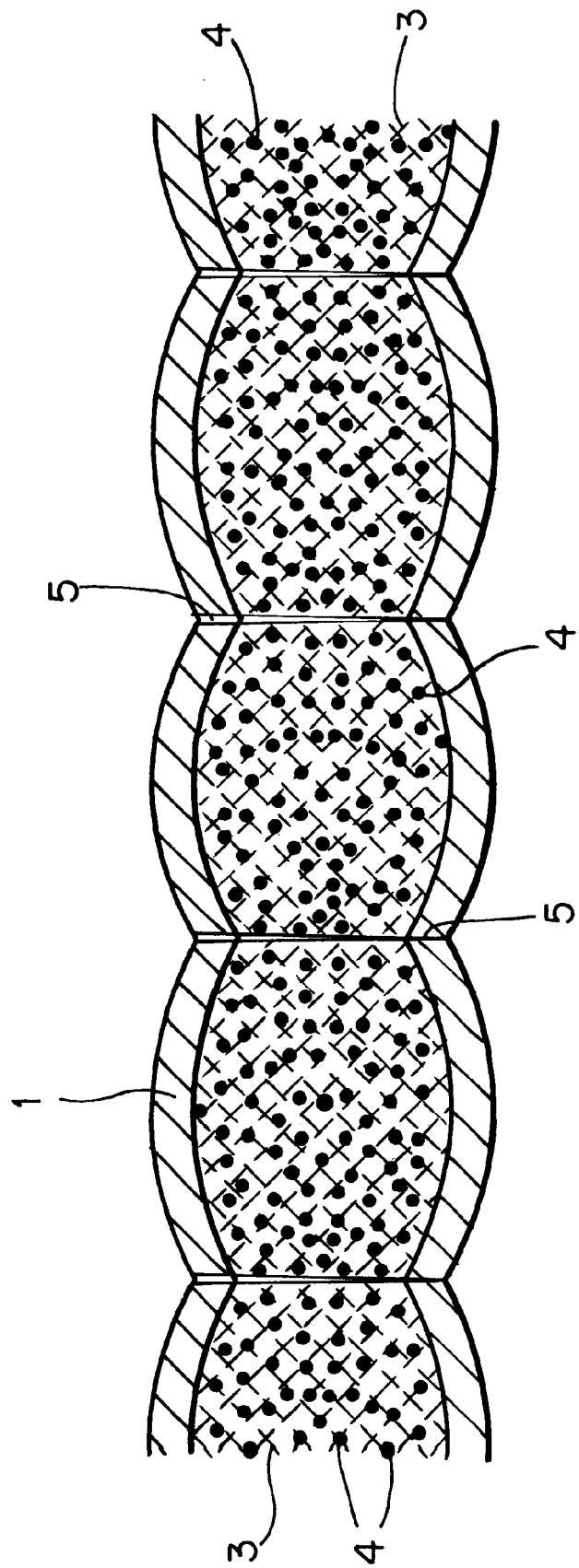

SEALING MAT FOR USE IN CIVIL AND UNDERGROUND ENGINEERING FOR THE INSULATION OF SOIL AGAINST LIQUIDS

BACKGROUND OF THE INVENTION

1. Technical Field of the Invention

The invention concerns a sealing mat for use in civil and underground engineering for the insulation of soil against liquids, especially water, having two outer layers comprising a fibrous material, between which is inserted a powder of mineral sealing material, e.g. bentonite, and the two layers are connected to each other.

2. Description of the Prior Art

In the most varied fields and civil and underground engineering works the fundamental necessity often exists of sealing against liquids or preventing liquids from spreading in the ground and from time to time to partition a defined volume of soil as regards moisture. In this way, in the case of waste dumps, contaminated soils and similar, it is necessary to ensure that no leakage water and other moisture enters into the ground lying beneath and above all not into the ground water where it can lead to serious pollution, unusability and even the poisoning of drinking water. The problem of sufficient sealing also arises in the case of ponds, sewage plants, storage reservoirs, canals, etc. For this purpose it is known to place a foil into the ground which ensures absolutely that liquids, and in particular water, are prevented from spreading. Besides plastic, it is also common to employ mineral sealing materials. The use of double-layered formed fabrics is known between which bentonite is inserted in a powder form as a mineral sealing material. The connection between the two formed fabrics is achieved through a needle bond. Bentonite is easy to handle and develops its waterproofing quality only when water is added, when it swells up and changes to a jelly-like substance. Whereby producing a film that is impervious to liquids. The use of this kind of sealing mat provided with bentonite as a mineral sealing material has found wide use in civil and underground engineering.

However, it proves a considerable disadvantage that the mats are are not laid out horizontally but as a rule at an angle oblique to the horizontal line. This causes shearing loads which are effective tangentially to the top surface of the sealing mat, thus frequently producing relative displacement of the two layers, considerably favored by the fact that in the presence of moisture the bentonite forms a jelly-like substance between the two formed fabrics and as a consequence a correspondingly lower coefficient of friction occurs, so that almost all the shearing force must be compensated for by the needle bond of the two formed fabrics. The forces that can be absorbed by this are comparatively low so that the shearing force created leads comparatively frequently to relative movement of the two formed fabrics. Both formed fabrics thus shift relatively to each other.

SUMMARY OF THE INVENTION

On this basis, it is the object of this invention to provide a sealing mat which is able to absorb high shearing loads. This object is solved in accordance with this invention whereby an aero-fleece is inserted between the two layers, in which the powder of mineral sealing material is embedded, and the two layers are sewn to each other with the aero-fleece located in between.

The theory according to this invention differs fundamentally from the prior art in two features. First, between the two outer layers, which represent a formed fabric or knitted fabric, a third formed fabric with a high ratio of pores per unit of volume is built in, i.e. a so called "aero-fleece", in which the mineral sealing material is embedded. By contrast in the state of the art the powder is inserted in a loose form like a sandwich element into the two outer formed fabric layers. As a further feature, the two outer formed or knitted fabrics and the aero-fleece are in their entirety sewn to one another. Both of these measures just described have the consequence that relative movement to one another of the two outer formed or knitted fabrics is prevented. On the one hand, the embedding of the mineral sealing material into the aero-fleece largely ensures that relative movement of the jelly-like mass resulting from contact with moisture is substantially hindered or even wholly prevented by the aero fleece. The needle bond substantially strengthens the whole mat which in its entirety is formed by the two outer formed or knitted fabrics with the aero-fleece and the sealing material located therein. The aero-fleece has a higher air ratio per volume unit, the pores of which serve to receive the powdery mineral sealing powder.

The application of the sealing mat in accordance with this invention occurs in the fields hitherto known, namely primarily in water engineering, i.e. in the construction of sewage plant, storage reservoirs, dam reservoirs, canals, biotopes, but also sewage plant, waste dumps as well as for exposing and sealing contaminated soils.

Within the framework of the invention it does not matter whether the fibrous fabric forming the two outer layers is a formed or a knitted fabric. The advantage of the latter consists therein that is possesses a greater tensile strength than formed fabrics, so that its use is to be seen as preferable. In principle, all mineral sealing materials can be considered for use in connection with the sealing mat in accordance with this invention. Here, too, as with the state of the art, the use of bentonite powder is seen as especially preferable and effective. To be stressed here is that the sealing mat is suitable not only for the retention of and insulation against water but also for all kinds liquids and especially for hydrocarbons.

After the mat according to this invention has been placed in the ground, the mineral sealing material swells when it comes into contact with the moisture. In order to ensure the continued desired watertightness, a certain compression must be set against the swelling pressure, which also ensures the watertightness of the mat in a damp condition. To this end, the sewing thread is led that it lies against both layers from outside. Hereby the outer layers are fixed in a point-like manner so that after absorbing the moisture, in the points of the thread, the sealing mat cannot widen at all, or only slightly, and in the neighboring regions somewhat more, and in this manner counteracts the swelling pressure and a high watertightness of the layer formed from the mineral sealing material is generated. To counteract the swelling pressure and to achieve a sufficient watertightness of the material, the individual sewing points should not lie too far apart. On the other hand, however, they should not be chosen too close to one another, because firstly if the necessary elasticity is lacking the danger of the thread being pulled out exists and secondly damage to the two layers through the thread is of such a frequency that it is no longer acceptable. Preferably, it is proposed to select the stitch length, which is yielded by the distance between neighbouring punctures with one and the same thread, in such a way that it corresponds more or less to the thickness of the mineral sealing material in a dry condition. Moreover, with close spacing the danger exists that the sealing material is pressed aside at the seam, thus allowing leakage at points.

Due to similar reflections, however, under further consideration of the fact that the production of the seams requires a considerable amount of work, in a further improvement it is proposed to select the distance between neighboring sewing lines so that it is more or less three to five times greater than the stitch length of the seam. If the distance were to be substantially reduced the time required to sew up the sealing mat would be increased many times over.

For certain applications, one endeavours, whilst avoiding air, to install the sealing mat directly to walls and masonry. For such applications it is preferred to use a sealing mat with which one of the two layers is provided with a large pore width, so that the initially powdery mineral sealing material can move outward. In order to prevent this from happening a sealing foil of water-soluble material, e.g. cellulose, is applied from outside, which prevents the mineral sealing material from moving outward. If the mineral sealing material now comes into contact with moisture after the sealing mat has been laid onto the wall surface, the sealing foil is destroyed and the powdery and mineral sealing material changes into a jelly-like condition through absorption of the moisture and at the same time moves partially out of the layer of large pore width, so that as a result the sealing mat rests directly against the wall over a layer of mineral sealing material mixed with moisture and therefore swollen. The enclosure of air and other gases is then is ruled out with certainty.

DETAILED DESCRIPTION OF THE DRAWING FIGURE

Further details, features and advantages of the invention can be taken from the following description part in which a typical embodiment of the invention is explained in greater detail with the aid of the drawing. It shows in schematic representation a sealing mat of the kind according to this invention in cross section.

The structure of the sealing mat is that of a kind of sandwich and consequently consists of a total of two layers (1, 2), both located outside, which in accordance with their structure are a kind of formed or knitted fabric. Between these an aero-fleece (3) is placed lying flat with both sides against layers (1, 2). In accordance with the definition it has a high ratio of pores, in which the powder particles (4) of the mineral sealing material are partially embedded, with the consequence that powder particles (4) are kept at a distance and cannot connect to form a jelly-like mass.

The two layers (1, 2) and the aero-fleece (3) are joined by a seam (5) to form a sealing mat of sandwich-like structure.

As a result one obtains a sealing mat with which relative motion of the two outer layers (1, 2) formed by knitted or formed fabric relatively to each other is prevented.

I claim:

1. A sealing mat for use in civil and underground engineering for an insulation of soil against liquids, especially water, said sealing mat comprising:

two outer layers comprised of a fibrous material;

a formed fabric layer having a high ratio of pores per unit of volume being provided between said two outer layers;

a powder of mineral sealing material being embedded exclusively in at least a portion of the pores of said formed fabric layer, said two outer layers being sewn to each other with said formed fabric layer being located therebetween.

2. The sealing mat according to claim 1, wherein said two outer layers are made of a knitted fabric.

3. The sealing mat according to claim 1, wherein said mineral sealing material is bentonite.

4. The sealing mat according to claim 1, wherein said two outer layers are sewn with a sewing thread which lies against both of said outer layers from outside said sealing mat.

5. The sealing mat according to claim 1, wherein said two outer layers are sewn with a stitch length of a seam being formed which corresponds approximately to the thickness of a layer of said mineral sealing material in a dry condition.

6. The sealing mat according to claim 5, wherein said two outer layers are sewn with a plurality of sewing lines with neighboring sewing lines being chosen approximately three to five times greater than the stitch length of said seam.

7. The sealing mat according to claim 5, wherein said mineral sealing material is bentonite.

8. The sealing mat according to claim 1, wherein one of said two outer layers is provided with a large pore width and is outwardly provided with a sealing foil comprising a water-soluble material.

9. The sealing mat according to claim 1, wherein said two outer layers and said formed fabric layer are all sewn to one another.

* * * * *